(No Model.)  2 Sheets—Sheet 1.

M. D. FERRIN.
MUSIC LEAF TURNER.

No. 523,272. Patented July 17, 1894.

Attest
Wm. F. Hall
Walter Donaldson

Inventor
Moroni D. Ferrin
by Ellis Spear
Atty.

(No Model.) 2 Sheets—Sheet 2.
M. D. FERRIN.
MUSIC LEAF TURNER.

No. 523,272. Patented July 17, 1894.

Attest
Wm. T. Hall
Wallern Mallsen

Inventor.
Moroni D. Ferrin
by Ellis Spear
Atty

UNITED STATES PATENT OFFICE.

MORONI DANIEL FERRIN, OF OGDEN, UTAH TERRITORY.

MUSIC-LEAF TURNER.

SPECIFICATION forming part of Letters Patent No. 523,272, dated July 17, 1894.

Application filed April 3, 1894. Serial No. 506,151. (No model.)

*To all whom it may concern:*

Be it known that I, MORONI DANIEL FERRIN, a citizen of the United States of America, residing at Ogden, in the county of Weber and Territory of Utah, have invented certain new and useful Improvements in Music-Leaf Turners, of which the following is a specification.

The object of my said invention is to provide a music leaf turner which will automatically turn a leaf first in one direction and then in the reverse direction to return the leaf to normal position in order to repeat, the turning mechanism being released by pressure upon a suitable key or finger bar.

The invention consists broadly in a suitable casing for supporting the music and containing a disk or wheel driven intermittently by a suitable motor, a lever arm pivoted to said casing having its outer end connected to the leaf to be turned, and connections between the disk or wheel and the lever arm whereby as the wheel revolves the arm will be rocked first in one direction and then in the other.

The invention also includes the construction, arrangement and combination of parts hereinafter described and particularly pointed out in the claims.

The invention is illustrated in the accompanying drawings, in which—

Figures 1, 7:
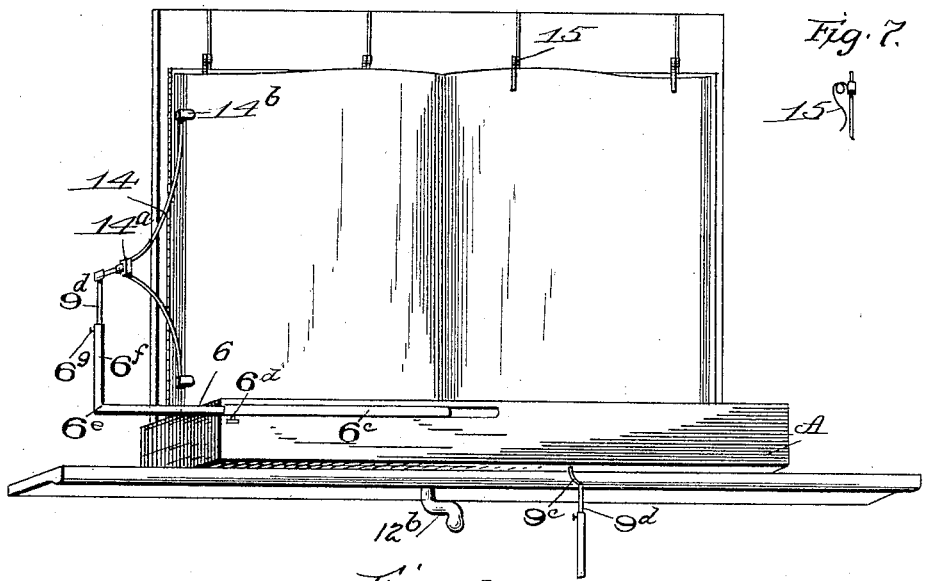
Figure 2:
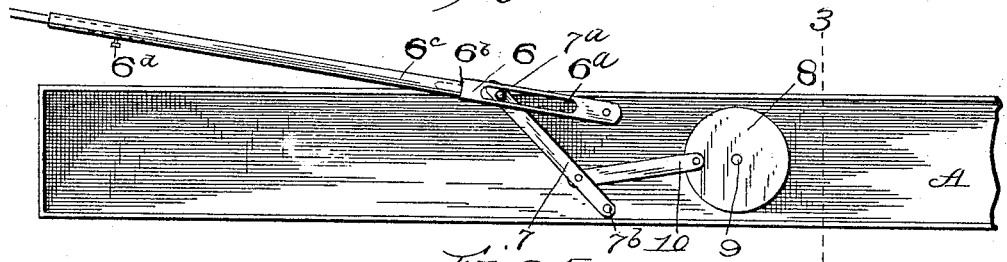
Figure 5:
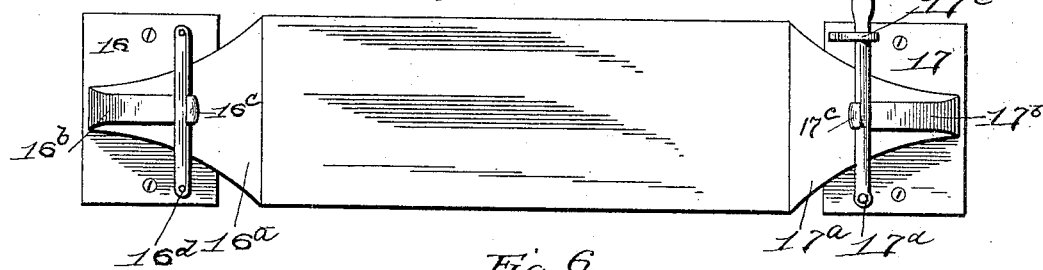
Figure 6:
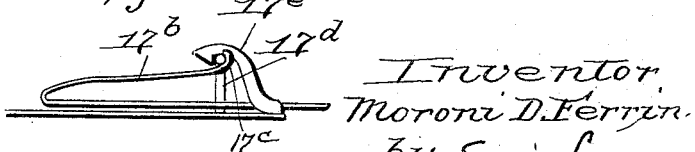
Figure 3:
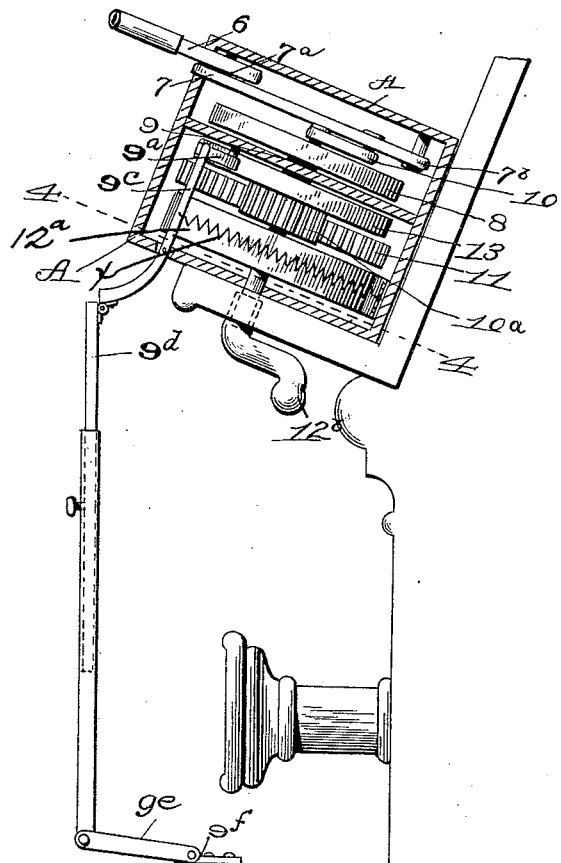
Figure 4:
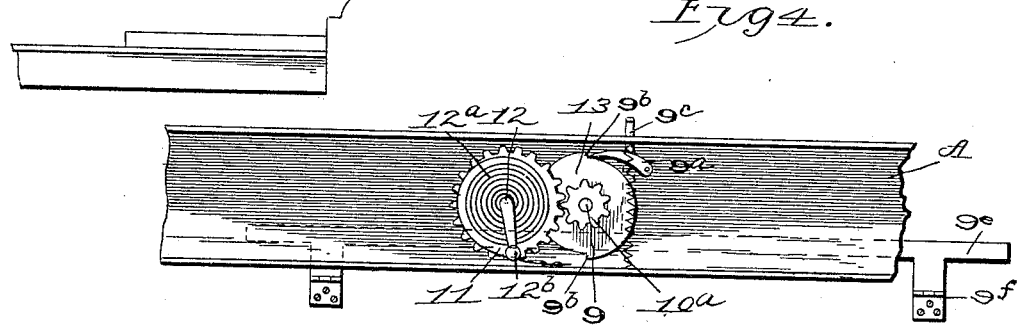

Figure 1, is a front view of my device as applied to the music rack or holder of an ordinary organ or piano. Fig. 2, is a top plan view of the casing with the top wall removed. Fig. 3, is a section on line 3—3 of Fig. 2. Fig. 4, is a fragmentary section on line 4—4 of Fig. 3, and Fig. 5, is a detail showing the manner of attaching the casing to the piano or organ. Figs. 6 and 7 are detail views of features of construction.

Referring more particularly to these views and to the numbered parts thereof, A represents a box or casing designed to rest upon the music holding shelf or bracket of a piano or organ and containing the motive power for turning the leaves. This casing is preferably about eighteen inches long and need not be over two inches square in cross section. A lever or leaf turning arm 6 is pivoted near the front of the casing and has an adjustable upturned outer end adapted for connection with the leaf to be turned as hereinafter described. This lever arm 6 is slotted as at $6^a$ and a lever 7, which has one end $7^b$ pivoted near the rear wall of the casing is provided at its opposite end with a pin or projection $7^a$ which engages the slot $6^a$ in the lever arm, thus providing a sliding connection.

A wheel or disk 8 rigidly mounted on the shaft 9 through which the motive power is supplied is connected by a link or rod 10 with the lever 7 intermediate its ends so that as the wheel 8 revolves the lever 7 will be rocked back and forth and by reason of its sliding connection with the lever arm 6 the latter will also be rocked back and forth carrying with it the leaf to be turned.

The wheel or disk 8 is driven by cogs or gear wheels $10^a$, 11 from a shaft 12, journaled in the casing provided with a spring $12^a$ and having a suitable handle or key as $12^b$ by means of which the motor may be wound up when run down, in substantially the manner of clock work.

In order to hold the parts against movement the pawl is held in proximity to the disk by a coiled spring $x$ connecting the rod $9^c$ with the opposite side of the casing except when the leaf is to be turned a disk 13 is provided on the shaft 9, which has two lugs or shoulders $9^b$ adapted for engagement with a spring pawl $9^a$ by which pawl the disk is held against movement. The shoulders are so arranged that when one of them is in engagement with the pawl the leaf turning arm will be held in its extreme position on the right, and when the other shoulder is engaged by the pawl the leaf turning arm will occupy its extreme position upon the left. The spring pawl is adapted to be thrown out of engagement with the shoulders of the disk by means of a rocking bar $9^c$, one end of which engages the spring pawl while the other end is connected to a vertically movable rod $9^d$ depending into proximity to the key board where it is connected to a longitudinally arranged bar or finger piece $9^e$ located over the base of the keys and hinged if desired to the piano as shown at $9^f$. It will thus be seen that a tap of the finger upon the finger bar will cause the pawl to be raised long enough to permit the engaging shoulder to pass beneath it and the disk will then revolve until the shoulder on the opposite side comes in contact with the pawl, thus shifting the leaf turning arm and with it the leaf from one side to the other. A second tap upon the finger piece will again release the disk which then continues to revolve until again stopped by the pawl, thus throwing the leaf turning arm back to its original position as in repeating.

The leaf turning arm 6 comprises the slotted portion $6^a$ into the end of which is screw threaded at $6^b$ a longitudinally adjustable or telescoping rod $6^c$. The parts of the rod $6^c$ are held in any desired relation to each other by means of a set screw $6^d$ by means of which the length of the rod may be adjusted to accommodate different widths of sheets.

The outer end of the rod $6^c$ is bent upwardly at right angles to the main portion as at $6^e$ and carries a vertically adjustable rod $9^d$ provided with set screw $6^g$ for holding it in its adjusted position. In order to provide a connection between the end of the arm and the leaf to be turned which will remove all liability of tearing the leaf due to the sudden starting of the arm I provide an elastic 14 having its central portion secured to the upper end of the rod $6^f$ by a suitable catch, $14^a$ and carrying on its ends the clamps or clasps $14^b$ adapted to engage the upper and lower portions of the edge of the sheet to be turned. The elastic will thus yield when the turning arm begins its movement and all danger of tearing the page will be entirely removed.

In order to hold the leaves which are not to be turned, spring catches 15 are provided which are prepared to slide up and down on the upright pieces of the rack. The pressure of the spring upon the rack holds the catch in any position in which it is placed.

While in the drawings I have shown mechanism for turning but a single leaf back and forth it will be readily understood that two, three or more leaves may be turned by providing an equal number of leaf turning arms and with a separate set of operating mechanism. I find in practice that by duplicating the operating mechanism shown the device will answer all ordinary purposes as the two leaf turning arms will expose six pages which will be amply sufficient for ordinary usage.

I prefer to fasten the box or case to the shelf of the piano or organ bracket as illustrated in Fig. 5, in which 16 and 17 represent two plates which I screw onto the piano or organ shelf at each end of the machine box or casing and $16^a$ and $17^a$ are projections from each end of the bottom of the box, while springs $16^b$ and $17^b$ curl up from the ends of the projections, the springs $16^b$ $17^b$ carrying catches $16^c$ $17^c$. A small plate $16^d$ is secured to the plate 16 but slightly raised therefrom to permit the extension $16^a$ to be inserted between it and the plate 16, and to provide a bearing for the spring catch $16^c$ to engage with. A plate $17^d$ is pivotally connected to the plate 17 and adapted to be swung over the end $17^a$ and be held over the same and in engagement with the catch $17^c$ by a catch $17^e$ thus locking the casing securely to the shelf.

Having thus described my invention, what I claim is—

1. In combination, the casing, the disk journaled therein under spring tension having oppositely located shoulders, a pawl for engaging the shoulders with connections for operating said pawl, a rocking leaf turning arm having a slotted shank, a lever having one end pivoted in the casing and its other end having sliding connection with said slotted shank, and a connecting rod between the disk and lever, substantially as described.

2. In a music leaf turner the combination with the leaf turning arm of an elastic having its central portion secured to said arm, and clasps secured to the ends of the elastic for engaging the leaves, substantially as described.

In testimony whereof I affix my signature in presence of two witnesses.

MORONI DANIEL FERRIN.

Witnesses:
I. M. FERRIN,
J. W. CARRIGAN.